United States Patent
Ushijima et al.

(10) Patent No.: US 9,022,579 B2
(45) Date of Patent: May 5, 2015

(54) CIRCUIT AND METHOD FOR LIGHTING HIGH PRESSURE DISCHARGE LAMP

(71) Applicant: Phoenix Electric Co., Ltd., Himeji-shi, Hyogo (JP)

(72) Inventors: Shinichi Ushijima, Himeji (JP); Tetsuya Gouda, Himeji (JP)

(73) Assignee: Phoenix Electric Co., Ltd., Hyogo (JP)

( * ) Notice: Subject to any disclaimer, the term of this patent is extended or adjusted under 35 U.S.C. 154(b) by 0 days.

(21) Appl. No.: 14/188,228

(22) Filed: Feb. 24, 2014

(65) Prior Publication Data

US 2015/0002825 A1    Jan. 1, 2015

(30) Foreign Application Priority Data

Jun. 27, 2013  (JP) ................................. 2013-135280

(51) Int. Cl.
   *H05B 41/26*   (2006.01)
   *H05B 41/292*  (2006.01)
   *H04N 9/31*    (2006.01)

(52) U.S. Cl.
   CPC ............ *H05B 41/26* (2013.01); *H05B 41/2928* (2013.01); *H04N 9/3114* (2013.01)

(58) Field of Classification Search
   USPC .............. 353/84, 85; 315/287, 271; 348/742, 348/743, 771
   See application file for complete search history.

(56) References Cited

U.S. PATENT DOCUMENTS

| | | |
|---|---|---|
| 2003/0160577 A1 | 8/2003 | Noguchi |
| 2007/0076175 A1 | 4/2007 | Nakagawa |
| 2009/0153806 A1* | 6/2009 | Yamauchi et al. .............. 353/85 |
| 2010/0013400 A1* | 1/2010 | Honsberg-Riedl et al. ... 315/246 |
| 2011/0095695 A1* | 4/2011 | Heike et al. .................... 315/287 |
| 2013/0038238 A1* | 2/2013 | Haacke et al. ................. 315/287 |

FOREIGN PATENT DOCUMENTS

| | | |
|---|---|---|
| DE | 44 10 177 A1 | 9/1995 |
| JP | 2001-068289 A | 3/2001 |
| JP | 2005-050662 A | 2/2005 |
| JP | 2012-501046 A | 1/2012 |
| JP | 2013-033605 A | 2/2013 |
| WO | WO2008/020582 A1 | 2/2008 |
| WO | WO2011/080620 A2 | 7/2011 |

OTHER PUBLICATIONS

Search Report of European patent application 14155545.8 filed Nov. 4, 2014.

* cited by examiner

*Primary Examiner* — William C Dowling
(74) *Attorney, Agent, or Firm* — Lucas & Mercanti, LLP

(57) ABSTRACT

It is an object of the present invention to provide a lighting circuit for and a lighting method of a high-pressure discharge lamp whereby remarkable reduction in illuminance maintaining rate can be avoided by reducing variation in inter-electrode distance in the beginning of usage without modulating a lighting frequency. The object can be achieved by a lighting circuit configured to light a high-pressure discharge lamp by supplying an alternating lamp current, which includes at least one pulse current superimposed on the former half of each half period of a base lamp current and at least two pulse currents and superimposed on the latter half of each half period, to the high-pressure discharge lamp.

6 Claims, 3 Drawing Sheets

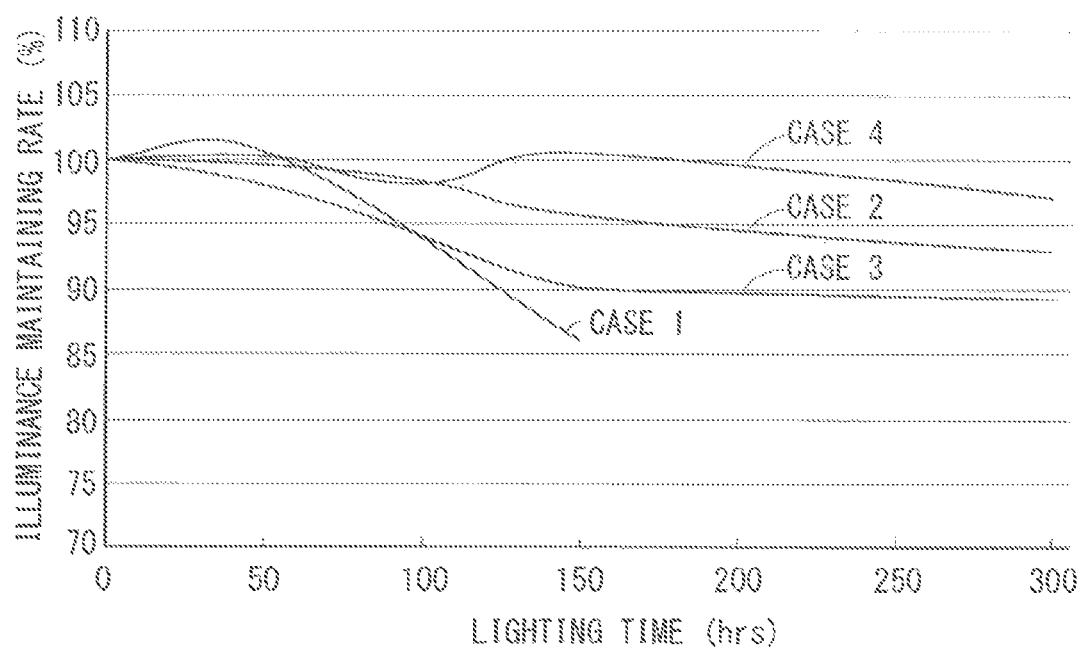

CIRCUIT AND METHOD FOR LIGHTING HIGH PRESSURE DISCHARGE LAMP

CROSS REFERENCE TO RELATED APPLICATION

This Application claims the priority of Japanese Patent Application No. 2013-135280 filed on Jun. 27, 2013, which is incorporated by reference herein.

BACKGROUND OF THE INVENTION

1. Field of the Invention

The present invention biases to a lighting circuit for and a lighting method of a high-pressure discharge lamp whereby a both-end voltage (i.e., lamp voltage) of the high-pressure discharge lamp can be stabilized for a long period of time.

2. Background Art

A high-pressure discharge lamp is applied to, for instance, a projector. In principle, a high-pressure discharge lamp can be operated by means of both direct current and alternating current. However, an operation by means of alternating current is normally considered to be preferable to enhance efficiency of the high-pressure discharge lamp, because rapid loss in either of a pair of electrodes can be herein avoided in comparison with an operation by means of direct current.

However, increase and redaction in both-end voltage (i.e., lamp voltage) have been observed in a high-pressure discharge lamp even when the high-pressure discharge lamp was operated by means of alternating current. Such increase and reduction are phenomena that have been observed since the high-pressure discharge lamp was new. Especially, remarkable increase in the lamp voltage was observed when a projector was set in "a normal mode" for lighting the high-pressure discharge lamp at a rated power. This was attributed to the fact that both of the pair of electrodes disposed within the high-pressure discharge lamp were worn by applying the rated power to the high-pressure discharge lamp, and thereby, the distance between the pair of electrodes (hereinafter referred to as "inter-electrode distance") was increased.

In terms of light utilization efficiency, a point light source is desired as a light source to be used for a projector. However, when the inter-electrode distance is increased in the high-pressure discharge lamp, a light emitting area is inevitably increased. Therefore, a drawback has been caused that light utilization efficiency is degraded and this results in great reduction in illuminance maintaining rate of the high-pressure discharge lamp in the beginning of usage. It should be noted that the illuminance maintaining rate hereinafter refers to a rate obtained by dividing "illuminance of light that is emitted from the high-pressure discharge lamp through an optical system and is effectively utilized in a given phase of the high-pressure discharge lamp" by "illuminance of light that is emitted from the high-pressure discharge lamp through the optical system and is effective utilized in a new product phase of the high-pressure discharge lamp".

To avoid such a drawback, Japan Laid-open Patent Application Publication No. JP-A-2013-033605, for instance, describes a technology for modulating a lighting frequency of a high-pressure discharge lamp. In short, the technology for modulating a lighting frequency refers to a technology that is configured to light a high-pressure discharge lamp at a lower frequency when the lamp voltage of the high-pressure discharge lamp is increased (i.e., when the inter-electrode distance is increased), and by contrast, is configured to light the high-pressure discharge lamp at a higher frequency when the lamp voltage is reduced (i.e., when the inter-electrode distance is reduced).

According to the technology for modulating a lighting frequency (i.e., the technology described in the Publication No. JP-A-2013-033605), remarkable reduction in illuminance maintaining rate can be avoided in the beginning of usage by reducing variation in inter-electrode distance in the high-pressure discharge lamp.

However, when the technology for modulating a lighting frequency is now applied to a DLP (Digital Light Processing) method employed by most of the commercial projectors, chances are that an image to be projected is negatively affected. Specifically, when the technology for modulating a lighting frequency is actually applied to a DLP projector, a drawback is produced that appropriate projection is limited only at a frequency that synchronization with a color wheel is achieved. Suppose the technology for modulating a lighting frequency is applied to the DLP projector despite that synchronization with the color wheel is not achieved, an output of light to be entitled from the high-pressure discharge lamp varies (i.e., light gets dark) in reversal of the polarity of damp current (i.e., at zero ampere). Accordingly, flicker is supposed to be caused in a projected screen.

The present invention has been developed in view of the aforementioned drawback of the conventional art. Therefore, it is a main object of the present invention to provide a lighting circuit for and a lighting method of a high-pressure discharge lamp whereby remarkable reduction in illuminance maintaining rate can be avoided by reducing variation in inter-electrode distance in the beginning of usage without modulating a lighting frequency.

SUMMARY OF THE INVENTION

An aspect of the present invention relates to:

a lighting circuit for a high-pressure discharge lamp, which is configured to light the high-pressure discharge lamp by supplying an alternating lamp current to the high-pressure discharge lamp, and wherein the alternating lamp current comprises a base lamp current and pulse currents, and at least one pulse current is superimposed on a former half of each half period of the base lamp current and at least two pulse currents are superimposed on a latter half of the each half period.

Further, it is preferred that one of the at least one pulse current superimposed on the former half of the each half period is located in the beginning of the each half period while one of the at least two pulse currents superimposed on the latter half of the each hair period is located in the end of the each half period.

It is preferred that each of the pulse currents has a width of 1% to 50% of a width of the each half period.

It is preferred that each of the pulse currents has a pulse height of 110% to 300% of a height of the base lamp current.

It is preferred that, when the lightning circuit is applied to a DLP projector including a color wheel, each of the pulse currents has a width matched with either a projection tarring of a specific color on the color wheel or a spoke time set between any adjacent colors on the color wheel.

It is preferred that the number of the at least one pulse current superimposed on the former half of the each half period is only one and the number of the at least two pulse currents superimposed on the latter half of the each half period is only two.

According to the present invention, remarkable reduction in illuminance maintaining rate can be avoided by reducing variation in inter-electrode distance in the beginning of usage without modulating a lighting frequency.

BRIEF DESCRIPTION OF THE DRAWINGS

FIG. 4 is a chart tor showing relations between lighting time and luminance maintaining rate in the practical example and the comparative examples.

DETAILED DESCRIPTION OF THE EMBODIMENTS

Figure 1:
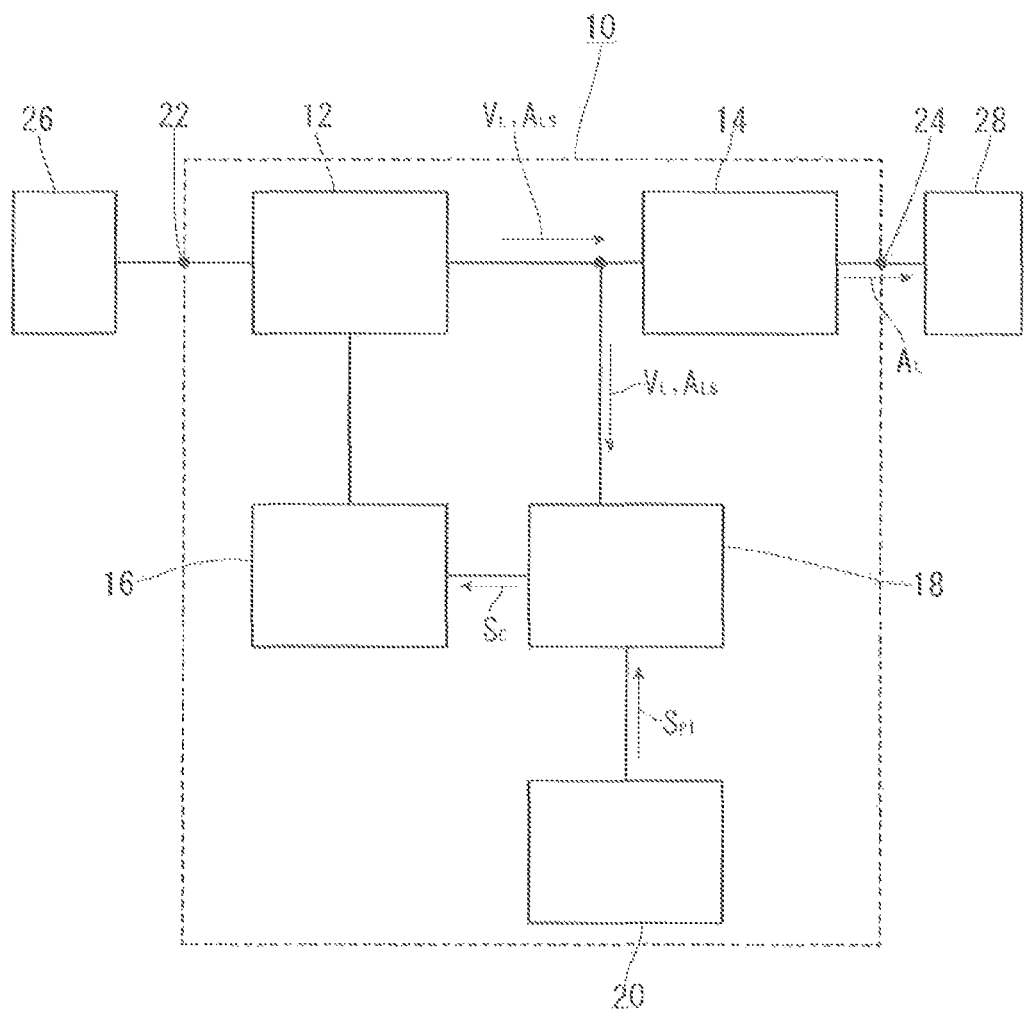
FIG. 1 is a circuit diagram showing an example of a lighting circuit to which the present invention is applied.

Using the attached drawings, explanation will be hereinafter made for a practical example of a lighting circuit 10 to which the present invention is applied. As shown in FIG. 1, the lighting circuit 10 comprises a down converter 12, a tall bridge circuit 14, a PWM (Pulse Width Modulation) circuit 16, an operating circuit 18, a pulse generation circuit 20, an input terminal 22 and an output terminal 24.

The down converter 12 is a circuit configured to reduce DC (Direct Current) voltage, applied thereto from a DC voltage source 26 introduced into the lighting circuit 10 through the input terminal 22, to a predetermined voltage value in response to a signal from the PWM circuit 16. The down converter 12 is also configured to supply the reduced DC voltage to the full bridge circuit 14. Although not shown in the drawings, a voltage seduction chopper circuit of a cynical switching source, which is composed of a power diode, a choke coil and a capacitor, is used for the down converter 12.

The full bridge circuit 14 is configured to convert the DC voltage from the down converter 12 into AC (Alternating Current) voltage and then supply the AC voltage to a high-pressure discharge lamp 28 through the output terminal 24. As described below, the PWM circuit 16, the operating circuit 18 and the pulse generation circuit 20 are configured to control the waveform of a lamp current $A_L$ to be supplied to the high-pressure discharge lamp 28 from the full bridge circuit 14.

Figure 2:
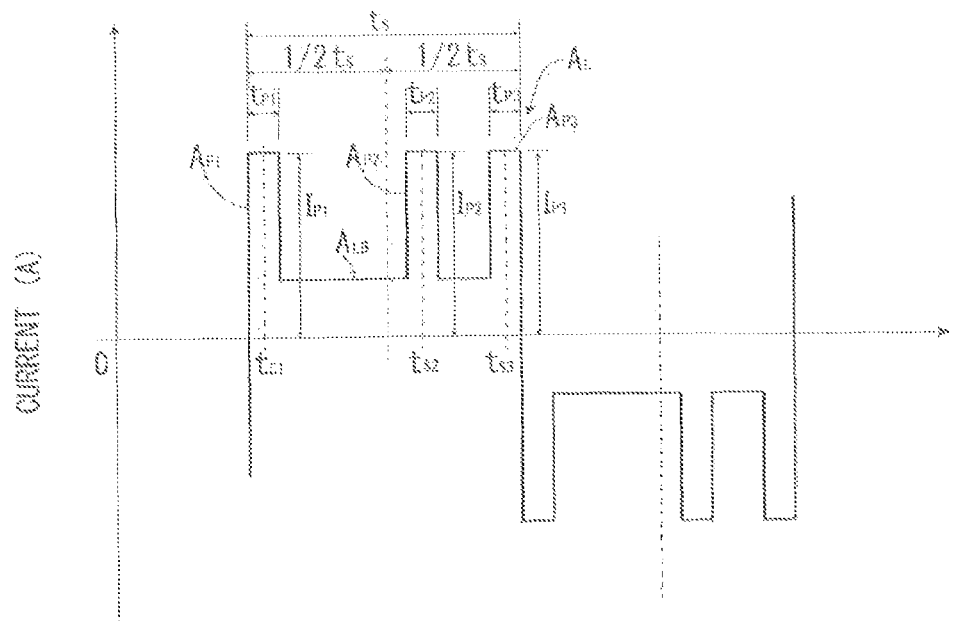
FIG. 2 is a diagram for showing an exemplary waveform of a lamp current to which the present invention is applied.

As shown in FIG. 2, the pulse generation circuit 20 is a circuit configured to generate pulse currents $A_{P1}$ to $A_{P3}$ to be superimposed on a base lamp current $A_{LB}$ having a roughly rectangular waveform in order to form the lamp current $A_L$ to be supplied to the high-pressure discharge lamp 28 from the full bridge circuit 14. The pulse generation circuit 20 has a signal generator (not shown in the drawings) configured to generate the pulse currents $A_{P1}$ to $A_{P3}$. The pulse generation circuit 20 is configured to output a pulse superimposition signal $S_{P1}$ to the operating circuit 18. The pulse superimposition signal $S_{P1}$, herein defines a pulse recurrence period ($t_S$), pulse current positions ($t_{S1}$ to $t_{S3}$) and pulse current widths ($t_{P1}$ to $t_{P3}$). It should be noted that the pulse generation circuit 20 may be provided within the lighting circuit 10 as with the light circuit 10 of the present practical example. Alternatively, the pulse generation circuit 20 may not be provided within the lighting circuit 10, and the lighting circuit 10 may receive the pulse superimposition signal $S_{P1}$ from the outside. Further, it should be noted that throughout the specification of the present application, the icon "pulse current" means "current varying for a quite short period of time" and does not mean "current continuously varying without intermittence".

With reference back to FIG. 1, the operating circuit 18 is a circuit configured to: receive a lamp voltage $V_L$ and a lamp current signal $A_{LS}$ that are outputted to the full bridge circuit 14 from the down converter 12, and further, the pulse superimposition signal $S_{P1}$ from the pulse generation circuit 20; perform a power control; and output a control signal $S_C$ to the PWM circuit 16. Specifically, the operating circuit 18 is configured to calculate the supply amount of the lamp current $A_L$ with respect to the lamp voltage $V_L$ based on both of the lamp voltage $V_L$ and the lamp current signal $A_{LS}$, while being configured to calculate superimposing timings with respect to the base lamp current $A_{LB}$ based on the pulse superimposition signal $S_{P1}$ such that an output current is increased (to pulse heights, i.e., $I_{P1}$ to $I_{P3}$) from the base lamp current $A_{LB}$ only for required durations (pulse widths, i.e., $t_{P1}$ to $t_{P3}$). Based on the calculated results, the operating circuit 18 is configured to output the control signal $S_C$ to the PWM circuit 16. In accordance, an output power to be supplied to the high-pressure discharge lamp 28 from the full bridge circuit 14 is also increased. It should be noted that the respective pulse heights $I_{P1}$ to $I_{P3}$ are desirably 110% to 300% of the height of the base lamp current $A_{LB}$, and may be different from each other. On the other hand, the respective pulse current widths $t_{P1}$ to $t_{P3}$ are desirably 1% to 50% of the width of the half period (recurrence period) $t_S$, and may be different from each other. In more detail, the respective pulse heights $I_{P1}$ to $I_{P3}$ are desirably 110% to 200% of the height of the base lamp current $A_{LB}$, whereas the respective pulse current widths $t_{P1}$ to $t_{P3}$ are desirably 1% to 30% of the width of the half period (recurrence period) $T_S$.

The PWM circuit 16 is a circuit configured to control a switching element of the down converter 12 based on the control signal $S_C$ received from the operating circuit 18. The PWM circuit 16 is configured to control the down converter 12 based on the control signal $S_C$ from the operating circuit 18 such that a power to be supplied to the high-pressure discharge lamp 28 is constant while pulse currents are superimposed on the base lamp current $A_{LB}$ at predetermined pulse widths ($t_{P1}$ to $t_{P3}$), predetermined pulse heights ($I_{P1}$ to $I_{P3}$) and predetermined superimposed timings.

Next, explanation will be made for the waveform of the alternating lamp current $A_L$ in the present practical example. In the present practical example, as shown in FIG. 2, one pulse current is configured to be superimposed on the former half of each half period of the base lamp current $A_{LB}$, while two pulse currents are configured to be superimposed on the latter half of each half period of the base lamp current $A_{LB}$. It is determined which of the former and latter halves of each half period a given pulse current is located in based on the width-directional center position of the given pulse current (a position of ½pulse current width $t_{P1}$, $t_{P2}$, $t_{P3}$, i.e., a pulse current position $t_{S1}$, $t_{S2}$, $t_{S3}$). In more detail, regarding the waveform of the lamp current $A_L$ in the present practical example, one pulse current to be superimposed on the former half of each half period is located in the beginning of each half period, while one of two pulse currents to be superimposed on the latter half of each half period is located in the end of each half period.

Thus, remarkable reduction in illuminance maintaining rate can be avoided in the beginning of usage without modulating a lighting frequency by superimposing one pulse current $A_{P1}$ of the former half of each half period of the base lamp current $A_{LB}$, and further, by superimposing two pulse currents $A_{P2}$ and $A_{P3}$ on the latter half of each half period of the base lamp current $A_{LB}$. Explanation will be hereinafter made for results of conducted comparative tests.

(Comparative Tests)

The following settings were prepared for comparison, including: a setting that one pulse current was superimposed only on the former half of each half period of the base lamp current $A_{LB}$ (Case 1); a setting that one pulse current was superimposed only on the latter half of each half period of the base lamp current $A_{LB}$ (Case 2); and a setting that one pulse current was superimposed on the former half of each half period of the base lamp current $A_{LB}$ while one pulse current was superimposed on the latter half of each half period of the base lamp current $A_{LB}$ (Case 3). It should be noted that "Case 4" is set to be the aforementioned practical example, i.e., the setting that one pulse current is superimposed on the former half of each half period of the base lamp current $A_{LB}$ while two pulse currents are superimposed on the latter half of each half period of the base lamp current $A_{LB}$. In any cases, a rated power control (at 150 W to 400 W) was conducted for the high-pressure discharge lamp 28. Explanation will be hereinafter made for an exemplary condition that the rated power control was conducted at 200 W.

Figure 3:
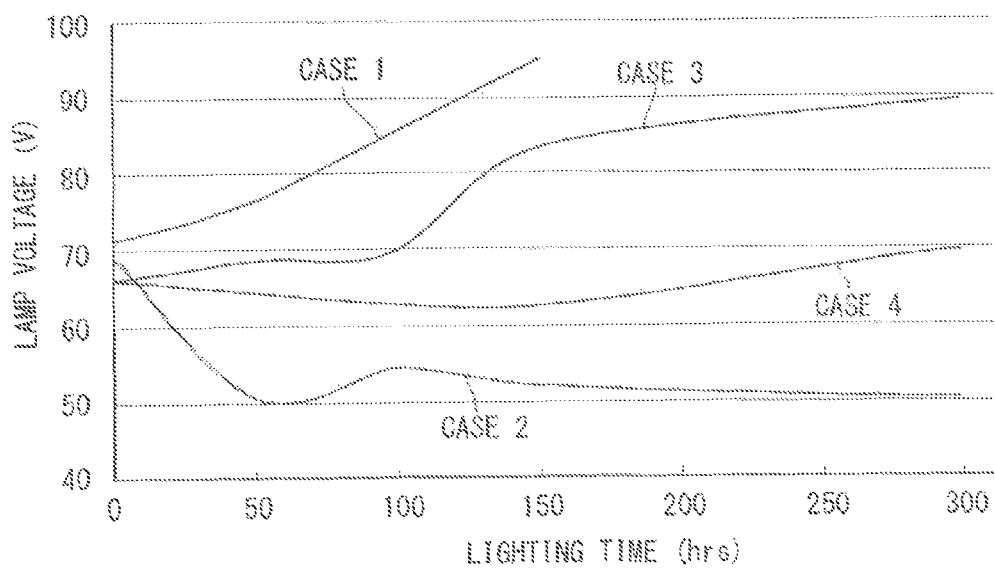
FIG. 3 is a chart for showing relations between lighting time and lamp voltage in a practical example and comparative examples.

FIGS. 3 and 4 and Table 1 show relations between "lighting time" and "lamp voltage" arid between "lighting time" and "illuminance maintaining rate" in the beginning of usage (300 hours) for the respective cases. In Case 1, the test was terminated in 150 hours because the lamp voltage was increased. This was attributed to the fact that the pair of electrodes widen the high-pressure discharge lamp 28 was worn and accordingly the inter-electrode distance was increased, where one pulse current was superimposed only on the former half of each half period of the base lamp current $A_{LB}$.

TABLE 1

| TIME (hrs) | LAMP VOLTAGE (V) | ILLUMINANCE MAINTAINING RATE (%) |
|---|---|---|
| CASE 1 | | |
| 0 | 71.4 | 100.0 |
| 50 | 76.9 | 100.7 |
| 150 | 95.3 | 86.2 |
| CASE 2 | | |
| 0 | 68.8 | 100.0 |
| 50 | 50.3 | 99.6 |
| 100 | 54.5 | 98.5 |
| 150 | 52.2 | 95.6 |
| 300 | 50.2 | 93.0 |
| CASE 3 | | |
| 0 | 66.2 | 100.0 |
| 50 | 68.6 | 98.1 |
| 100 | 70.2 | 94.3 |
| 150 | 83.5 | 90.1 |
| 300 | 89.9 | 89.3 |
| CASE 4 | | |
| 0 | 66.1 | 100.0 |
| 50 | 64.0 | 100.2 |
| 100 | 63.0 | 98.1 |
| 150 | 62.5 | 100.6 |
| 300 | 70.2 | 97.2 |

In Case 2, the lamp voltage was reduced to roughly 50V in the early stage, and thereafter, transitioned in a range from 50V to 55V. This was attributed to the fact that tungsten was deposited on the surface of the pair of electrodes within the high-pressure discharge lamp 28 and accordingly the inter-electrode distance was reduced, where one pulse current was superimposed only on the latter half of each half period of the base lamp current $A_{LB}$. As a reason for the fact that the lamp voltage was reduced in the early stage and was then no further reduced, it can be assumed that in accordance with deposition of tungsten on the surfaces of the electrodes, the distance from a light emitting part at a high temperature to the surfaces of the electrodes (more accurately, opposed surfaces of tungsten deposited on the surfaces of the pair of electrodes) is reduced; the amount of heat to be received by the electrodes from the light emitting part is accordingly increased; and thereby, equilibrium is roughly achieved between the amount of tungsten melted by the heat and the amount of tungsten deposited on the electrodes.

In Case 3, the lamp voltage was stable until elapse of roughly 100 hours from the beginning, but was rapidly increased thereafter. As a reason for this, it can be assumed that in Case 3, the lamp voltage was gradually increased until elapse of 100 hours from the beginning; in accordance, the lamp current value was reduced (by the rated power control); and thereby, the balance between electrode quantity and electrode temperature (i.e., a condition of precipitation or tungsten) was lost. Furthermore, as a reason for starting of rapid increase in lamp voltage, it can be assumed that as a result of the lost balance, deposition of tungsten was hardly caused whereas the electrodes were worn, and accordingly, the inter-electrode distance was increased.

In Case 4 to which the present invention was applied, the lamp voltage was successfully stable for 300 hours. As a reason for this, it can be assumed that, where one pulse current was superimposed on the former half of each half period of the base lamp current $A_{LB}$ while two pulse currents were superimposed on the latter half of each half period of the base lamp current $A_{LB}$, balance was obtained between wear of the electrodes within the high-pressure discharge lamp 28 to be caused by "the pulse current superimposed on the former half of each half period" and deposition of tungsten on the surfaces of the electrodes to be caused by "the pulse currents superimposed on the latter half of each half period", and accordingly, the inter-electrode distance did not greatly vary in the long run.

Based on the above, as shown in FIG. 4, it is understood that Case 4 maintained a high illuminance maintaining sate until elapse of 300 hours from the beginning in comparison with the other cases.

Further in Case 4, even when the quantity of the electrodes and lighting power to be used for the high-pressure discharge lamp 28 or the type of projector is changed, the lamp voltage can be stably maintained for a long period of time by regulating the pulse width and the pulse height of one pulse current superimposed on the former half of each half period of the base lamp current $A_{LB}$ and those of two pulse currents superimposed on the tatter half of each half period of the base lamp current $A_{LB}$.

It should be noted that the number of pulse currents is not limited to that described in the aforementioned practical example. As long as balance is obtained between wear of the electrodes within the high-pressure discharge lamp 28 and deposition of tungsten on the electrodes, two or more pulse currents may be superimposed on the former half of each half period of the base lamp current $A_{LB}$ while three or more pulse currents may be superimposed on the latter half of each half period of the base lamp current $A_{LB}$.

Moreover, when the lighting method according to the present practical example is applied to a DLP projector and so forth, it is preferred to match the width of each pulse current with the projection timing of a specific color on the color wheel. The respective pulse currents may correspond to different colors on the color wheel, or alternatively, may all correspond to the same color on the color wheel. Yet alternatively, the respective pulse currents may correspond to intervals set among adjacent colors (i.e., spoke times) on the color wheel.

Furthermore, the superimposed positions of pulse currents may be arbitrarily set as long as on pulse current is superimposed on the former half of each half period of the base lamp current while two pulse currents are superimposed on the latter half of each half period of the base lamp current. However, as described in the aforementioned practical example, it is preferred to set the superimposed positions of pulse currents such that one pulse current superimposed on the former half of each half period of the base lamp current is located in the beginning of each half period of the base lamp current, while one of two pulse currents superimposed on the latter half of each half period of the base lamp current is located in the end of each half period of the base lamp current. Herein, the phrase "located in the beginning of each half period of the lamp current" means that a pulse current starts simultaneously when the polarity of current is changed, whereas the phrase "located in the end of each half period of the base lamp current" means that the polarity of current is changed simultaneously when a pulse current ends.

The reason for the aforementioned preferred setting is that the effect of wearing the electrodes is further increased as the superimposed position of a pulse current is located further forward in each half period of the base lamp current, whereas the effect of causing deposition on the electrodes is increased as the superimposed position of a pulse current is located further rearward in each half period of the base lamp current. Therefore, even when the heights of pulse currents are low, sufficient effects can be achieved by positioning the pulse currents in the beginning and the end of each half period of the base lamp current. Further, the amount of heat generated in the electrodes can be suppressed by lowering the heights of the pulse currents. Thus, it is possible to avoid a trouble to be caused when the electrodes are excessively heated.

Moreover, the lighting circuit 10 according to the present practical example is configured to receive DC voltage from the DC voltage source 26. However, the lighting circuit 10 may be obviously configured to receive AC voltage from an AC voltage source. In this case, a rectifier circuit (not shown in the drawings), configured to convert AC voltage into DC voltage, is designed to be set on the upstream of the down converter 12 in the lighting circuit 10.

It should be understood that the exemplary embodiment herein disclosed is illustrative only and is not restrictive in all respects. It is intended that the scope of the present invention is indicated by the appended claims rather than the aforementioned explanation, and encompasses all the changes that come within the meaning and range of equivalents of the appended claims.

The disclosure of Japanese Patent Application No. 2013-135280 filed Jun. 27, 2013 including specification, drawings and claims incorporated herein by reference in its entirety.

Reference Signs List

10—Lighting circuit, 12—Down converter, 14—Full bridge circuit, 16—Pulse width modulation circuit (PWM circuit), 18—Operating circuit, 20—Pulse generation circuit, 22—Input terminal, 24—Output terminal, 26—DC voltage source, 28—High-pressure discharge lamp

What is claimed is:

1. A lighting circuit for a high-pressure discharge lamp, the lighting circuit being configured to light the high-pressure discharge lamp by supplying an alternating lamp current to the high-pressure discharge lamp, wherein
   the alternating lamp current comprises a base lamp current and pulse currents,
   each of the pulse currents has an output current greater than an output current of the base lamp current,
   at least one pulse current is superimposed on a former half of each half period of the base lamp current and at least two pulse currents are superimposed on a latter half of the each half period, and
   one of the at least one pulse current superimposed on the former half of the each half period is located in the beginning of the each half period while one of the at least two pulse currents superimposed on the latter half of the each half period is located in the end of the each half period.

2. The lighting circuit for a high-pressure discharge lamp according to claim 1, wherein each of the pulse currents has a width of 1% to 50% of a width of the each half period.

3. The lighting circuit for a high-pressure discharge lamp according to claim 1, wherein each of the pulse currents has a pulse height of 110% to 300% of a height of the base lamp current.

4. The lightning circuit for a high-pressure discharge lamp according to claim 1, the lighting circuit being applied to a DLP projector including a color wheel, wherein each of the pulse currents has a width matched with either a projection timing of a specific color on the color wheel or a spoke time set between any adjacent colors on the color wheel.

5. The lightning circuit for a high-pressure discharge lamp according to claim 1, wherein the number of the at least one pulse current superimposed on the former half of the each half period is only one and the number of the at least two pulse currents superimposed on the latter half of the each half period is only two.

6. A method of lighting a high-pressure discharge lamp by supplying an alternating lamp current to the high-pressure discharge lamp, wherein
   the alternating lamp current comprises a base lamp current and pulse currents,
   each of the pulse currents has an output current greater than an output current of the base lamp current,
   at least one pulse current is superimposed on a former half of each half period of the base lamp current and at least two pulse currents are superimposed on a latter half of the each half period, and
   one of the at least one pulse current superimposed on the former half of the each half period is located in the beginning of the each half period while one of the at least two pulse currents superimposed on the latter half of the each half period is located in the end of the each half period.

* * * * *